United States Patent [19]
Slattery et al.

[11] Patent Number: 5,975,410
[45] Date of Patent: Nov. 2, 1999

[54] PROCESS OF BONDING A METAL BRUSH STRUCTURE TO A PLANAR SURFACE OF A METAL SUBSTRATE

[75] Inventors: Kevin T. Slattery, St. Charles; Daniel E. Driemeyer, Manchester; Gerald W. Wille, Olivette, all of Mo.

[73] Assignee: McDonnell Douglas Corporation, St. Louis, Mo.

[21] Appl. No.: 08/921,582

[22] Filed: Sep. 2, 1997

[51] Int. Cl.⁶ .................................................... C25D 5/02
[52] U.S. Cl. ..................... 228/189; 228/189; 228/178; 228/175; 228/176
[58] Field of Search .................................... 228/189, 178, 228/175, 176; 204/192.1, 192.11, 192.12

[56] References Cited

U.S. PATENT DOCUMENTS

| 4,159,934 | 7/1979 | Kadija | 204/224 R |
| 5,024,735 | 6/1991 | Kadija | 204/15 |

*Primary Examiner*—Patrick Ryan
*Assistant Examiner*—M. Alexandra Elve
*Attorney, Agent, or Firm*—Westerlund & Powell, P.C.; Robert A. Westerlund; Ramon R. Hoch

[57] ABSTRACT

Process for bonding a metal brush structure to a planar surface of a metal substrate in which an array of metal rods are retained and immobilized at their tips by a common retention layer formed of metal, and the brush structure is then joined to a planar surface of a metal substrate via the retention layer.

20 Claims, 2 Drawing Sheets

FIG.1
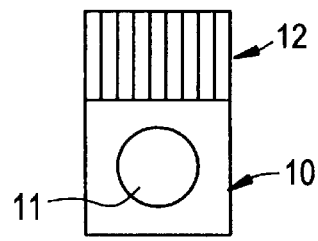
FIG.2A     FIG.2B
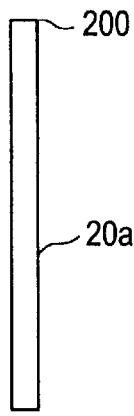 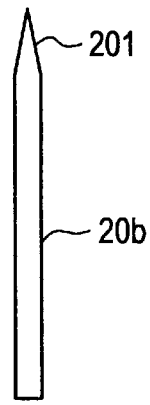
FIG.3A     FIG.3B
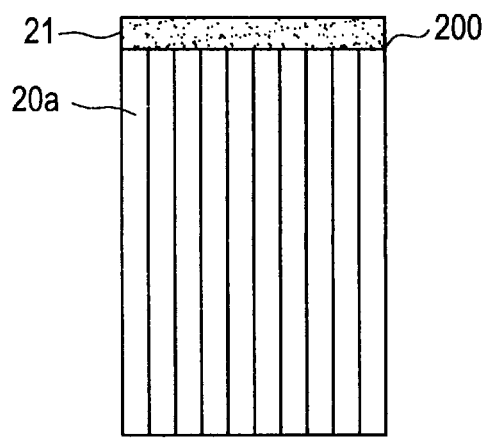 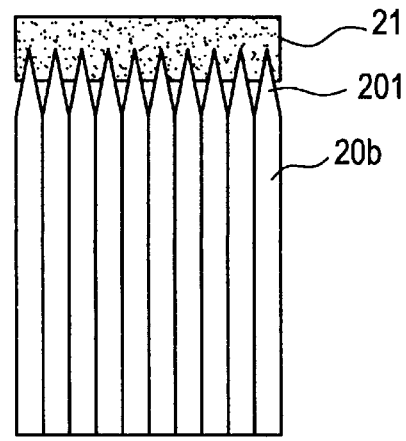

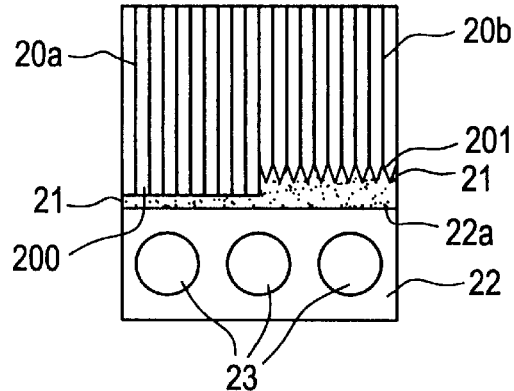
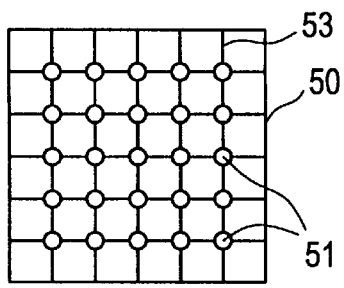
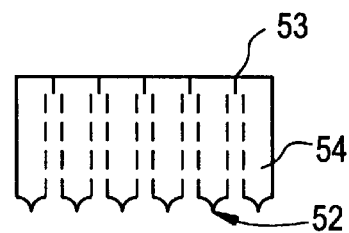
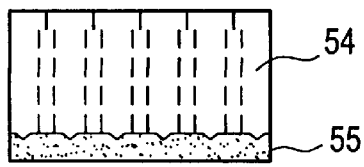
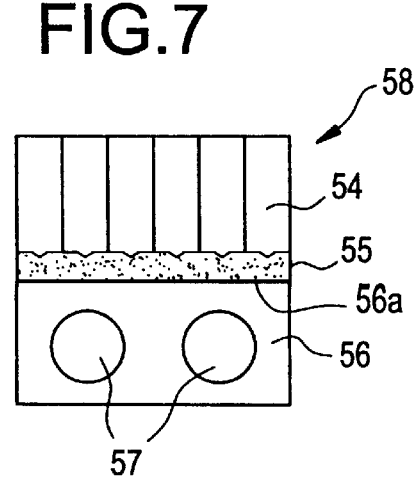

PROCESS OF BONDING A METAL BRUSH STRUCTURE TO A PLANAR SURFACE OF A METAL SUBSTRATE

This invention was made under contract no. AC-3013 awarded by Sandia National Lab. The Government has certain rights to this invention.

BACKGROUND OF THE INVENTION

The invention relates to bonding a metal brush structure to a planar surface of a metal substrate.

One of the difficulties in the fabrication and use of bonded joints of metal materials is accommodating any differences in the respective coefficients of thermal expansion (CTE). CTE is also often referred to as the coefficient of linear expansion, and these terms have interchangeable meaning. The difference in CTE's of bonded materials can result in stresses being exerted at the bondline during thermal cycling and after joinder at elevated temperatures. These stresses can reduce the service life, and even cause failure of the joints. The joint failures are especially prone to occur during cool-down from the initial joining temperature or in the course of heat cycles during service.

A method of reducing these stresses has involved the use of what is known as a "brush" structure in which one of the two materials is configured as small metallic filaments, which effectively reduces the strain, and thus, the stresses at the edge of the joint.

An inter-metal bonding system of interest in nuclear fusion research in particular is that of copper to tungsten. As illustrated in FIG. 1, in the nuclear fusion research milieu, the application of copper-tungsten bonds involves joining an exterior surface of a water-cooled copper alloy heat sink 10 to a tungsten tile 12, referred to occasionally herein as "armor," to protect the copper alloy material constituting the heat sink 10 from the sputtering erosion and occasionally extreme temperatures that can be generated by the reactor. The copper heat sink 10 has one or more interior water channels 11 that permits water to flow through the heat sink 10 for heat exchange and cooling purposes. In this context, the "brush" structure can be incorporated into tungsten tile 12. However, prior attempts made at fabricating such a structure using thin wires in the construction of tungsten brush tile 12 have not been entirely successful, and the cost have been prohibitive from a production standpoint, due in part to the handling problems associated with the use of fine wires. Also, the presence of copper throughout the brush structure has proven onerous because the copper must be etched or machined out prior to service.

SUMMARY OF THE INVENTION

The invention relates to a process for bonding a metal brush structure to a planar surface of a metal substrate in which an array of metal rods are retained and immobilized at their tips by a common retention layer formed of metal, and the brush structure is then joined to a planar surface of a metal substrate via the retention layer.

In a first embodiment of the present invention, a so-called bundled rod process is conducted in which a metal brush is formed as small diameter metal rods which are machined at their distal ends and bundled together in an array by a fixture, and then the array of rods is bonded to a planar surface of a metal substrate. The metal rod size is not particularly limited. The smaller the rod, the lower the joint stresses; while the bigger the rods, the simpler the bundling and bonding.

In a second embodiment of the invention, a so-called bored hole process is conducted in which a metal brush is formed subtractively by taking a tile and boring holes and grooving (scoring) them, and then bonding the tile having the scored holes to a planar surface of a substrate. While this is not a "brush" structure as initially joined, processing and service stresses cause the joined areas between the holes to crack, resulting in a brush structure in service.

The processes of the present invention are generally applicable to joining metal brush arrays to metal structures in a wide variety of settings, including, but not limited to, fusion reactor research, heat shields, beam targets, and electronic applications.

The terminology "bonds" and variants thereof as used herein, means securely joining or uniting two or more separate bodies together to form an integral structure.

BRIEF DESCRIPTION OF THE DRAWINGS

These and various other features and aspects of the present invention will be readily understood with reference to the following detailed description read in conjunction with the accompanying drawings, in which:

FIG. 1 is cross-sectional view of a copper alloy heat sink joined to a tungsten armor brush tile according to the prior art.

FIGS. 2A and 2B show cross section views of flat ended and spike ended rods useable in the bundled rod process embodiment of the invention.

FIGS. 3A and 3B shows a cross section view of the flat ended and spike ended rods of FIGS. 2A and 2B with their tips immobilized by a retention layer.

FIG. 4 is a cross-sectional view of a copper alloy heat sink joined to a tungsten armor brush tile of FIGS. 3A, 3B via the retention layer.

FIG. 5A shows a plan view of tungsten tile having bores and scoring provided according to the bored hole process embodiment of the invention.

FIG. 5B shows a side view of the tile of FIG. 5A including column crowns.

FIG. 6 shows a cross section view of the bore holed and scored tungsten tile having the column crowns immobilized by a retention layer.

FIG. 7 is a cross-sectional view of a copper alloy heat sink joined to a tungsten armor brush tile of FIG. 5B via the retention layer.

The drawings are not necessarily to scale, as the thicknesses of the various layers are shown for visual clarity and should not be interpreted in a limiting sense unless otherwise indicated herein.

DETAILED DESCRIPTION OF THE INVENTION

The two basic modes of this invention are each described in greater detail by way of the illustrations provided below.

While the invention is exemplified in terms of joining a tungsten brush to a copper substrate where heightened thermal mismatch concerns arise, it will be understood that the concepts of the present invention apply generally to bonding metal brush structures to a planar surface of a metal substrate, and the constituent materials of which can be different or identical metals. For instance, both the brush and substrate can be steel or aluminum.

Referring now to the drawings, and particularly to FIGS. 2A and 2B, a description of the bundled rod process mode of the invention begins by showing tungsten rods which are cut to length, and the distal ends of the rods are machined to present either a flat surface 200 as on rods 20a (FIG. 2A), or a pointed tip 201 as on rods 20b (FIG. 2B). The rod diameters are not particularly limited, but typically range from $\frac{1}{32}$ to $\frac{1}{4}$ inch (0.8 to 6.4 mm). The cross-sectional shape of the rods 20a, 20b is not particularly limited, and can be round, triangular, square, rectangular, or any other suitable geometric shape.

Processing of rods with both types of rod tips are illustrated below. Next, the rods 20a, 20b are bundled together in an array with the rods 20a, 20b physically spaced apart and out of contact with one another. The bundling of the rods can be accomplished by any one of: (a) clamping the rods in a fixturing tool; (b) placing the rods through cells defined by a metallic, polymeric, or ceramic honeycomb; or (c) casting or depositing a sodium silicate glass in a molten, flowable state around the bundles and solidifying the glass by cooling.

These bundling procedures permit the rods to be oriented perpendicularly or at an angle. The honeycomb fixture offers the advantage of precise and secure alignment of the rods until the rods are joined at their tips or joined to a copper substrate in subsequent steps described below. A metallic honeycomb core optionally can be heavily oxidized prior to initial bundling of the rods to prevent the honeycomb core from bonding to the tungsten rods or the copper substrate.

The bundled rods then have their tips (distal ends) 200, 201 retentively joined together by a tip retention layer 21, as shown in FIGS. 3A and 3B. The choice of material used in the retention layer encompasses materials which can be applied in a flowable condition to wet and coat the rod tips, and then be hardened or solidified to form a unitary layer gripping the plurality of rods. For instance, the tips 200, 201 can be plasma spray coated with a metal or metal alloy, such as copper or copper alloy, using a conventional thermal plasma spray system. For example, air is used to blow the copper and any other alloy powders from separate supply lines into the hot zone of a conventional multi-ported plasma gun with valving providing to meter and adjust the relative proportions of each powder feed introduced into the hot zone of the gun where the powders commingle. The powders are melted into an alloy in a hot zone of the gun and then sprayed in droplet form as directed at the rod tip ends 200, 201 where the droplets solidify upon cooling.

However, other methods of coating the tips 200, 201 of tungsten rods 20a, 20b can be used in lieu of the plasma spray coating method described above, or in conjunction therewith. These coatings can either be thin (i.e., in the micron range); medium (e.g., for coated pointed tips 201), or thick (i.e., in the mm range to coat well past the rod tips and extend the coating down the shaft lengths of the rods). The alternative methods of coating a metal or metal alloy to form the retention layer 21 besides or in addition to plasma spray coating include: physical vapor deposition (e.g., sputtering, thermal vacuum evaporation); chemical vapor deposition; electroplating; ion vapor deposition; ion plating; pressed metal powders; pressed and sintered metal powders; metal casting; and similar methods. Appropriate intermediate coatings can be used to improve adhesion of the retention layer 21 and the rod tips 200, 201.

Once the tip retention layer 21 is formed, any honeycomb fixture is removed, or optionally retained in the assembly as a permanent component thereof if the honeycomb material is one which does not outgas at elevated temperatures. If a sodium silicate glass was used to bundle the rods, it can removed at this stage by dissolution in water.

Then the outer surface of the metallic tip retention layer 21 of copper or copper alloy, for example, is machined or ground smooth. The smoothed surface of the retention layer 21 is then dipped in an etchant to remove any native oxide and then it is brought into contact with a planar surface 22a of a copper heat sink substrate 22 having through-going water channels 23. As with the tungsten type rods 20a, 20b, the metal substrate is not necessarily limited to the exemplary type of metal.

The copper substrate 22, shown in FIG. 4, can be joined to the retention layer 21 holding the rod tips by hot pressing, brazing, soldering, and similar techniques. In one refinement of the invention, it is optionally possible to apply soft metal interlayers to the planar surface 22a of substrate 22 as a pretreatment before joinder to the retention layer 21 holding rods 20a, 20b. The soft interlayer(s) serve to enhance penetration of the rod ends 200, 201. The soft interlayer(s) can be formed by, for example, plasma spraying, annealing of the copper alloy substrate 22, explosion bonding, roll bonding, or by applying a cold-pressed copper powder layer to surface 22a.

A preferred technique for joining the substrate 22, whether pretreated or not, to the retention layer 21 holding the rods 20a, 20b is hot pressing using, for example, hot isostatic pressing (HIP) at relatively high temperatures of 450–550° C. and applying 105 MPA or greater pressure for 180–240 minutes, to unite the copper substrate 22 to the retention layer 21. To use HIP, the lay up of the copper substrate 22 and retention layer 21-rod array 20a, 20b is placed in a can or comparable restraining means effective to restrain the lateral surfaces of the layers during the hot pressing process. The HIP process is implemented using an autoclave-like system in which the can holding the intermediate assembly is placed within an airtight pressure vessel which is filled with argon or other inert gas and the interior of the reaction vessel is heated to a very high temperature and brought to a very high pressure to compress the lay up layers together to form a resulting consolidated, integral assembly. Then the consolidated assembly is removed from the can.

Alternatively, brazing, such as Cu—Mn, Cu—Ti, or Ag-based vacuum or flux braze, or soldering, can be used to join the copper substrate 22 to the retention layer 21 holding the rods 20a, 20b. After uniting the copper substrate 22 to the rods 20a, 20b via retention layer 21, the exterior (outermost) surface of the tungsten rods 20a, 20b can be ground, if needed, to meet surface requirements. The finished bonded structure 26 is shown in FIG. 4. Although FIG. 4 shows both spiked rods 20b and flat ended rods 20a, it will understood that each type of rod can be used singly or in combination in the assembly. Also, the joint line at retention layer 21 in the finished structure shown in FIG. 4 will be thinner as applied due to penetration of copper from the copper substrate 22 between gaps of rods 20a, 20b and any points in the case of the spiked rods 20b.

Referring again to the drawings, and particularly to FIGS. 5A and 5B, a description of the bored hole process mode of the invention begins by showing bore holes 51 formed in a regular pattern in a tungsten tile 50. The bore holes 51 can be formed by any convenient technique, such as waterjet cutting, electro-discharge machining (EDM), or laser cutting. A profile bond surface is needed which can be accomplished by crowning or knurling using machining, waterjet cutting, or an EDM process. In this way crowns 52, which alternatively can be flat, are formed as shown in FIG. 5B. Then, the opposite bond surface of tungsten tile 50 is scored, such as by laser, EDM, machining, or waterjet cutting, to form score lines 53 intersecting at the bore holes 51. Scoring can be done concurrently with hole boring. The hole boring and scoring process define nascent rod shapes or columns 54 which will fully emerge after subsequent processing steps.

Next, as shown in FIG. 6, the columns 54 have their tips (distal ends) 52 retentively joined together by a tip retention layer 55. The retention layer 51 must form a unitary layer gripping the ends 52 of the plurality of columns 54. The choice of material used in the retention layer 55 encompasses the same various types of deposited materials described for retention layer 21 above, but further includes Cu/W functionally graded material (FGM). The FGM can be formed either by thermal plasma spraying a blend of copper and tungsten powders having the proportion of copper to tungsten varied so as have a progressively increasing fraction of copper content in a direction moving away from a tungsten tile 50 towards the copper alloy heat sink body 56. Alternatively, the FGM can be formed by stacking a plurality of cold-pressed powder blends of copper and tungsten having the proportion of copper to tungsten varied from layer to layer within the stack so as have a progressively increasing fraction of copper content in a direction moving away from a tungsten tile 50 towards the copper alloy heat sink body 56. The copper-tungsten FGM interlayer 24 generally can be in the 0.5 to 5 mm thick range, preferably about 2 mm. The functionally graded material (FGM) type of retention layer 55 reduces any thermal stresses at the transition zone or joint between the tungsten tile body 50 and copper substrate body 56 having different CTE's by changing the relative amounts of the two materials over the intervening distance represented by FGM interlayer 55. This avoids a relative abrupt transition at the joint.

After forming the retention layer 55 on the outer surfaces 52 of columns 54, then the outer surface of the retention layer 55 is machined or ground smooth. The smoothed surface of the retention layer 55 is then dipped in an etchant to remove any native oxide.

If needed, the tungsten tile 50 can be precracked at this stage of the process, such as by thermal shock methods or by filling holes 51 with water and freezing the water.

Then, tile 50 having the ends 52 bonded together by retention layer 55 is brought into contact with a planar surface 56a of a copper heat sink substrate 56 having through-going water channels 57, as shown in FIG. 7. As with the tungsten tile 50, the copper heat sink substrate 56 is not necessarily limited to the exemplary type of metal.

The copper substrate 56, shown in FIG. 7, can be joined to the retention layer 55 by hot pressing, brazing, soldering, and similar techniques, similar to those described above in connection with the joinder of copper substrate 22 to the retention layer 21. The exterior (outermost) surface of the tungsten columns 54 can be ground, if needed, to meet surface requirements. The finished consolidated structure 58 is shown in FIG. 7.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

For example, although this invention has been exemplified in the context of uniting a tungsten armor brush tile to a water-cooled copper alloy heat sink, such as used for fusion reactor research, it will be appreciated that this invention has other potential applications. The process of the invention is generally applicable to joining metal brush arrays to metal structures in a wide variety of settings, including, but not limited to, not only fusion reactor research, but heat shields, beam targets, and electronic applications.

What is claimed:

1. A process for bonding a metal brush structure having free distal ends to a planar surface of a metal substrate, comprising: retaining and immobilizing an array of metal rods at said free distal ends of said metal rods by a common retention layer comprising metal, and then joining said brush structure to a planar surface of a metal substrate via said retention layer.

2. The process of claim 1, wherein said retention layer is formed on said free ends of said metal rods by a deposition process selected from the group consisting of plasma spray, sputtering, thermal vacuum evaporation, chemical vapor deposition, electroplating, ion vapor deposition, casting, and pressed powder.

3. A process for bonding a metal brush structure having free distal ends to a planar surface of a metal substrate, comprising the steps of:

providing a metal brush comprising spaced apart metal rods which are machined at distal ends of said rods;

bundling said rods together in an array by using a fixture;

retaining and immobilizing said distal ends of said metal rods by using a common retention layer comprising metal;

optionally removing said fixture; and joining said brush structure to a planar surface of a metal substrate via said retention layer.

4. The process of claim 3, wherein said fixture is a honeycomb structure.

5. The process of claim 3, wherein said free distal ends of said brush structure are flat.

6. The process of claim 3, wherein said free distal ends of said brush structure are pointed tips.

7. A process for bonding a metal brush structure having distal ends to a planar surface of a metal substrate, comprising the steps of:

providing a tungsten tile;

boring holes through said tungsten tile;

scoring said holes in said tungsten tile to define metal columns in said tungsten tile, said columns terminating in distal ends;

retaining and immobilizing said distal ends of said columns by using a common retention layer comprising metal;

optionally precracking said tungsten tile, if necessary, along score lines; and joining said brush structure to a planar surface of a metal substrate via said retention layer.

8. The process of claim 1, wherein said metal rods comprise tungsten, said metal substrate comprises copper, and said common retention layer comprises copper.

9. The process of claim 1, wherein said metal rods comprise steel, and said metal substrate comprises steel.

10. The process of claim 1, wherein said metal rods comprise aluminum, and said metal substrate comprises aluminum.

11. The process of claim 1, wherein said joining comprises a bonding procedure selected from the group consisting of hot pressing, brazing, and soldering.

12. The process of claim 1, further comprising, prior to said retaining and immobilizing step, the step of bundling the rods by clamping said rods in a fixturing tool.

13. The process of claim 1, further comprising, prior to said retaining and immobilizing step, the step of bundling the rods by placing said rods through cells defined by a honeycomb structure.

14. The process of claim 13, further comprising, after said joining step, removing the honeycomb structure from the rods.

15. The process of claim 1, further comprising, prior to said retaining and immobilizing step, the step of bundling the rods by introducing a sodium silicate glass in a molten, flowable state around the rods and solidifying the glass by cooling.

16. The process of claim 1, further comprising, prior to said retaining and immobilizing step, the step of bundling the rods whereby said rods extend perpendicularly.

17. The process of claim 1, further comprising, prior to said retaining and immobilizing step, the step of bundling the rods whereby said rods extend at an angle.

18. The process of claim 1, wherein said retention layer is formed on said free ends of said metal rods by plasma spraying.

19. The process of claim 3, wherein said metal rods comprise metal selected from the group consisting of tungsten, steel, and aluminum; said metal substrate comprises metal selected from the group consisting of copper, steel, and aluminum; and said common retention layer comprises copper.

20. The process of claim 7, wherein said metal substrate comprises copper and said common retention layer comprises copper and tungsten.

* * * * *

Disclaimer and Dedication

5,975,410 — Kevin T. Slattery, St. Charles, MO (US) Daniel E. Driemeyer, Manchester, MO (US) Gerald W. Wille, Olivette, MO. PROCESS OF BONDING A METAL BRUSH STRUCTURE TO A PLANAR SURFACE OF A METAL SUBSTRATE. Patent dated Nov. 2, 1999. Disclaimer filed Feb. 27, 2004 by the assignee, McDonnell Douglas Corp.

Hereby disclaims and dedicates to the pubic all claims and entire term of said patient.

*(Official Gazette, August 10, 2004)*